United States Patent
Oi et al.

(10) Patent No.: US 7,230,059 B2
(45) Date of Patent: Jun. 12, 2007

(54) PROCESS FOR PRODUCING OLEFIN COPOLYMER

(75) Inventors: Nobuo Oi, Narashino (JP); Hitoshi Tsukui, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 10/540,512

(22) PCT Filed: Dec. 18, 2003

(86) PCT No.: PCT/JP03/16213

§ 371 (c)(1),
(2), (4) Date: Jun. 23, 2005

(87) PCT Pub. No.: WO2004/058832

PCT Pub. Date: Jul. 15, 2004

(65) Prior Publication Data

US 2006/0116497 A1    Jun. 1, 2006

(30) Foreign Application Priority Data

Dec. 26, 2002    (JP) .............................. 2002-376684

(51) Int. Cl.
*C08F 236/20* (2006.01)
*C08F 236/22* (2006.01)
(52) U.S. Cl. ...................... 526/308; 526/284; 526/336; 526/339
(58) Field of Classification Search ................ 526/308, 526/284, 336, 339
See application file for complete search history.

(56) References Cited

U.S. PATENT DOCUMENTS 5,837,791 A * 11/1998 Sagane et al. .............. 526/336
5,981,676 A    11/1999 Gauthier et al.
6,288,193 B1    9/2001 Iseki et al.
6,313,241 B1   11/2001 Gauthier et al.
6,790,917 B2    9/2004 Oi
2002/0121223 A1 * 9/2002 Oi et al. ................. 106/164.42

FOREIGN PATENT DOCUMENTS

| CN | 1254350 A | 5/2000 |
| DE | 10222683 A1 | 5/2003 |
| JP | 5-202137 A | 8/1993 |
| JP | 6-172450 A | 6/1994 |
| JP | 2000-128926 A | 5/2000 |
| JP | 2000-128932 A | 5/2000 |
| JP | 2002-338617 A | 11/2002 |
| WO | WO-98/49212 A1 | 11/1998 |
| WO | WO-99/16799 A1 | 4/1999 |
| WO | WO-99/16824 A1 | 4/1999 |

* cited by examiner

*Primary Examiner*—Fred Teskin
(74) *Attorney, Agent, or Firm*—Birch, Stewart, Kolasch & Birch, LLP

(57) ABSTRACT

A process for producing an olefin-based copolymer, which comprises copolymerizing at least one olefin selected from the group consisting of ethylene and straight chain α-olefins, and a vinyl compound (I) and a polyene (II) described below:

Vinyl compound (I); a vinyl compound represented by the general formula $CH_2=CH-R$, wherein the substituent R is a saturated hydrocarbon group and steric parameters Es and B1 of the substituent R are respectively −1.64 or less and 1.53 or more; and Polyene (II); a compound having two or more of ethylene bonds and at least one combination of two ethylene bonds in which those are bonded to each other through at least three carbon atoms.

3 Claims, No Drawings

PROCESS FOR PRODUCING OLEFIN COPOLYMER

FIELD OF THE INVENTION

The present invention relates to a process for producing an olefin-based copolymer.

BACKGROUND ART

Molded bodies of olefin-based resins are used in the fields of automobile parts such as instrument panels, packaging materials such as trays for food packaging, films for food packaging and the like, and sundries such as cases for writing materials, jackets for books, and the like from viewpoints of easiness in handling, low cost, hygiene and the like.

In recent years, copolymerization of an olefin with a monomer having a bulky substituent, which was conventionally difficult, became possible according to development of a catalyst technology. For example, the copolymerization of ethylene and vinylcyclohexane became possible by a polymerization catalyst using dimethysilyl(tetramethylcyclopentadienyl)(3-tert-butyl-5-methyl-2-phenoxy) titanium dichloride, and studies for applying copolymers obtained by the copolymerization to various materials, have been carried out(for example, JP2000-128932 A). Further, it is important that though molecular weight of the copolymer depends on use thereof, it generally has a high molecular weight to a certain extent for providing preferable properties.

DISCLOSURE OF THE INVENTION

The present invention provides a process for producing an olefin-based copolymer containing monomer units derived from a vinyl compound having a bulky substituent, and having a high molecular weight.

Namely, the present invention relates to a process for producing an olefin-based copolymer, which comprises copolymerizing at least one olefin selected from the group consisting of ethylene and straight chain α-olefins, a vinyl compound (I) described below and a polyene (II) described below:

Vinyl compound (I): a vinyl compound represented by the general formula $CH_2=CH-R$, wherein the substituent R is a saturated hydrocarbon group and steric parameters Es and B1 of the substituent R are respectively $-1.64$ or less and 1.53 or more; and Polyene (II): a compound having at least two ethylene bonds and at least one combination of two ethylene bonds in which those are bonded to each other through at least three carbon atoms.

MODE FOR CARRYING OUT THE INVENTION

The vinyl compound (I) used in the present invention is a vinyl compound represented by the structural formula $CH_2=CH-R$, in which the substituent R is a saturated hydrocarbon group and steric parameters Es and B1 of the substituent R are respectively $-1.64$ or less and 1.53 or more. Herein, the "steric parameters Es and B1" are parameters indicative of the steric bulkiness of a substituent (Es and B1 indicate three-dimensional extent and two-dimensional extent, respectively) and are determined by a method described in literature [C. Hansch and A. Leo: "Exploring QSAR Fundamentals and Applications in Chemistry and Biology" Chapter 3 (ACS Professional Reference Book, Washington, D.C. (1995)). It is indicated that the smaller the value of Es is, the larger the three dimensional extent is, and the larger the value of B1 is, the larger the two dimensional extent is, The steric parameter Es of the substituent R is $-1.64$ or less, preferably $-1.70$ or less, more preferably $-1.75$ or less, and the steric parameter B1 of the substituent R is 1.53 or more, preferably 1.70 or more, more preferably 1.91 or more.

When the parameter Es is too large or the parameter B1 is too small, it is not preferable because the obtained copolymer is inferior in transparency and heat resistance. Further, from the viewpoint of availability, the steric parameter Es of the substituent R is preferably $-3.10$ or more, more preferably $-2.80$ or more, particularly preferably $-2.35$ or more, most preferably $-2.10$ or more, and the steric parameter B1 is 2.90 or less, more preferably 2.70 or less, particularly preferably 2.60 or less.

The substituent R of the vinyl compound (I) is preferably a secondary alkyl group, a tertiary alkyl group or a cycloalkyl group from the viewpoint of heightening of transparency and heat resistance.

Specific examples of the vinyl compound (I) include vinylcyclopropane, vinylcyclobutane, vinylcyclopentane, vinylcyclohexane, vinylcycloheptane, vinylcyclooctane, vinylnorbornane, vinyladamantane, 3-methyl-1-butene, 3-methyl-1-pentene, 3-methyl-1-hexene, 3-methyl-1-heptene, 3-methyl-1-octene, 3,3-dimethyl-1-butene, 3,3-dimethyl-1-pentene, 3,3-dimethyl-1-hexene, 3,3-dimethyl-1-heptene, 3,3-dimethyl-1-octene, 3,4-dimethyl-1-pentene, 3,4-dimethyl-1-hexene, 3,4-dimethyl-1-heptene, 3,4-dimethyl-1-octene, 3,5-dimethyl-1-hexene, 3,5-dimethyl-1-heptene, 3,5-dimethyl-1-octene, 3,6-dimethyl-1-heptene, 3,6-dimethyl-1-octene, 3,7-dimethyl-1-octene, 3,3,4-trimethyl-1-pentene, 3,3,4-trimethyl-1-hexene, 3,3,4-trimethyl-1-heptene, 3,3,4-trimethyl-1-octene, 3,4,4-trimethyl-1-pentene, 3,4,4-trimethyl-1-hexene, 3,4,4-trimethyl-1-heptene, 3,4,4-trimethyl-1-octene and the like, and these may be used two or more. Among vinyl compounds (I), vinylcyclopentane, vinylcyclohexane, vinylcycloheptane, vinylcyclooctane, vinylnorbornane, 3-methyl-1-butene, 3-methyl-1-pentene, 3-methyl-1-hexene, 3,3-dimethyl-1-butene, 3,3-dimethyl-1-pentene, 3,4-dimethyl-1-pentene, 3,5-dimethyl-1-hexene, 3,3,4-trimethyl-1-pentene and 3,4,4-trimethyl-1-pentene are preferred, and vinylcyclopentane, vinylcyclohexane, vinylnorbornane, 3-methyl-1-butene, 3-methyl-1-pentene, 3,3-dimethyl-1-butene and 3,3-dimethyl-1-pentene are more preferred.

The values of steric parameters of specific examples of the vinyl compounds (I) are shown in Table 1.

TABLE 1

| Compound | Es | B1 |
| --- | --- | --- |
| 3-methyl-1-butene | −1.71 | 1.90 |
| 3-methyl-1-pentene | −2.37 | 1.90 |
| Vinylcyclopentane | −1.75 | 1.90 |
| Vinylcyclohexane | −1.81 | 1.91 |
| 3-ethyl-1-pentene | −3.12 | 2.13 |
| 3,3-dimethyl-1-butene | −2.78 | 2.60 |
| 3,3-dimethyl-1-pentene | −3.40 | 2.60 |
| 3,5,5-trimethyl-1-hexene | −3.09 | 1.90 |
| 3,4-dimethyl-1-pentene | −3.05 | 1.90 |
| 3,4,4-trimethyl-1-pentene | −4.57 | 1.90 |
| 3-ethyl-4-methyl-1-pentene | −4.35 | 1.90 |
| 3,3,4-trimethyl-1-pentene | −4.66 | 2.60 |

The straight chain a-olefin is preferably a straight chain α-olefin having 3 to 20 carbon atoms. Specific examples of such a straight chain α-olefin include propylene, 1-butene, 1-pentene, 1-hexene, 1-heptene, 1-octene, 1-nonene, 1-decene and the like, preferably propylene, 1-butene, 1-hexene and 1-octene, and preferably propylene in particular.

In the present invention, the molecular weight of the copolymer obtained can be heightened by copolymerizing the polyene (II). The polyene (II) is a compound having two or more of ethylene bonds and at least one combination of two ethylene bonds in which those are bonded to each other through at least three carbon atoms. Herein, when it is a compound having an aliphatic ring or aromatic ring, the number of carbon atoms existing between two ethylene bonds means the smallest number of carbon atoms among numbers of carbon atoms existing between two ethylene bonds.

Moreover, the number of carbon atoms existing between two ethylene bonds does not include the number of carbon atoms constituting the two ethylene bonds (proviso that when another ethylene bond exists between the two ethylene bonds, the number of carbon atoms of the ethylene bond existing between the two ethylene bonds is included).

Specific examples of the polyene (II) include aromatic compounds such as m-divinylbenzene, p-divinylbenzene, 1,3,5-trivinylbenzene, 1,3-divinylnaphthalene and 2,4-divinylnaphthalene; and aliphatic compounds such as 1,6-heptadiene, 1,6-octadiene, 1,7-octadiene, 1,6-nonadiene, 1,7-nonadiene, 1,8-nonadiene, 1,6-decadiene, 1,7-decadiene, 1,8-decadiene, 1,9-decadiene, 1,10-undecadiene, 1,11-dodecadiene, 1,19-eicosadiene, 2-methyl-1,6-heptadiene, 3-methyl-1,6-heptadiene, 2-methyl-1,7-octadiene, 1,6,8-nonatriene, 1,3,7-octatriene, 1,3,6-heptatriene, 1,4,7-octatriene, 1,3,5,7-octatetraene, 1,5-cyclononadiene and 1,6-cyclodecadiene. The polyene (II) having two ethylene bonds is preferably an aliphatic compound, more preferably aliphatic diene. The most preferable diene is 1,7-octadiene, 1,9-decadiene or 1,11-cyclodecadiene. The polyene (II) has 7 or more of carbon atoms. Further, though the number of carbon atoms of the polyene is not particularly limited, the number of carbon atoms is preferably 15 or less from the viewpoint of more heightening of the molecular weight of the copolymer. Furthermore, the polyene (II) is preferably a compound having two ethylene bonds from the viewpoint of improvement of weatherability and processability.

In the production of the copolymer, in addition to at least one olefin selected from the group consisting of ethylene and straight chain α-olefins, the vinyl compound (I) and the polyene (II), at least one addition polymerizable monomer other than those may be copolymerized. The addition polymerizable monomer includes, for example, vinyl compounds such as vinyl ethers (e.g. methyl vinyl ether, ethyl vinyl ether), unsaturated carboxylic acids (e.g. acrylic acid, methacrylic acid), unsaturated carboxylic acid ester (e.g. methyl acrylate, ethyl acrylate, methyl methacrylate), vinyl nitrites (e.g. acrylonitrile) and vinyl esters (e.g. vinyl acetate).

As a polymerization catalyst used for copolymerizing at least one olefin selected from the group consisting of ethylene and straight chain α-olefins, the vinyl compound (I) and the polyene (II), a catalyst obtained by contacting a transition metal compound having a cyclopentadiene type anion skeleton (metallocene compound), and an organoaluminum compound and/or a boron compound, so-called a metallocene catalyst is preferable. As the metallocene compound, compounds described in, for example, U.S. Pat. No. 4,542,199, U.S. Pat. No. 4,536,484, U.S. Pat. No. 4,937,299, U.S. Pat. No. 5,324,800, U.S. Pat. No. 4,530,914, U.S. Pat. No. 4,769,510, U.S. Pat. No. 5,703,187, U.S. Pat. No. 5,243,001, U.S. Pat. No. 6,329,478, U.S. Pat. No. 5,986,029, U.S. Pat. No. 5,962,719, U.S. Pat. No. 6,063,880 and the like can be cited. Among metallocene compounds, for example, a compound which is represented by the following formula (I) and has two cyclopentadiene type anion skeletons in which the two cyclopentadiene type anion skeletons are connected each other through a group containing at least one of a carbon atom, silicon atom, nitrogen atom, oxygen atom, sulfur atom and phosphorus atom, is preferable.

(I)

wherein M is a transition metal atom of Group 4 of the Periodic Table of the Elements; L is a group having a cyclopentadiene type anion skeleton and two L's may be the same or different each other; Y is a group bridging the two L's and a group containing at least one of a carbon atom, silicon atom, nitrogen atom, oxygen atom, sulfur atom and phosphorus atom; and two X's are respectively independently a hydrogen atom, halogen atom, alkyl group, aralkyl group, aryl group, substituted silyl group, alkoxy group, aralkyloxy group, aryloxy group or heterocyclic group.

In the above formula (I), the transition metal atom represented by M is preferably a titanium atom, a zirconium atom or a hafnium atom, and more preferably a titanium atom or a zirconium atom. In more detail, catalysts described in U.S. Pat. No. 4,769,510, U.S. Pat. No. 5,243,001, U.S. Pat. No. 5,962,719 and U.S. Pat. No. 6,063,880 can be cited.

In addition, with respect to the organoaluminum compound and the boron compound, the descriptions of the above-described U.S. patents can be also cited, as the organoaluminum compound, triethylaluminum, triisobutylaluminum, methylalumoxane and the like can be preferably listed, and as the boron compound, tris(pentafluorophenyl)borane, triphenylmethyltetrakis(pentafluorophenyl)borate, tri(n-butyl)ammoniumtetrakis(pentafluorophenyl)borate, N,N-dimethylaniliniumtetrakis(pentafluorophenyl)borate and the like can be preferably listed.

As used amounts of respective catalyst components, when the organoaluminum compound is used, the molar ratio of the aluminum atom of the organoaluminum to the transition atom of the metallocene compound is usually 0.1 to 10000, and when the boron compound is used, the molar ratio of the boron atom of the boron compound to the transition atom of the metallocene compound is usually 0.01 to 1000. When the respective components are used in the state of a solution or state suspended in a solvent, the concentration of the respective components can be appropriately selected according to the conditions such as ability of an apparatus for feeding the respective components in a polymerization reactor, and the concentration of the metallocene compound is usually from 0.01 to 500 μmol/g, that of the organoaluminum is usually from 0.01 to 10000 μmol/g in terms of Al atom, and that of the boron compound is usually from 0.01 to 500 μmol/g.

In the copolymerization of the present invention, publicly known processes such as slurry polymerization, solution polymerization, high pressure ion polymerization and gas phase polymerization can be adopted When a solvent used in the slurry polymerization and solution polymerization includes, for example, a saturated hydrocarbon solvents such as butane, hexane and heptane, and aromatic hydrocarbon solvents such as toluene and xylene, the polymerization temperature is usually 10 to 120° C., and polymerization pressure is usually 0.1 to 5 MPa. In the high pressure ion polymerization, the polymerization pressure is usually 25 to 500 MPa and the polymerization temperature is usually 130 to 350° C. In the gas phase polymerization, the polymerization temperature is usually 50 to 100° C. and the polymerization pressure is usually 1 to 5 MPa.

The amount of the polyene (II) used in polymerization is usually 0.000001 to 0.5 mol, preferably 0.00001 to 0.1 mole, more preferably 0.0001 to 0.05 mol, particularly preferably 0.0005 to 0.02 mol and most preferably 0.001 to 0.01 mol per 1 mol of the vinyl compound (I).

The content of monomer units derived from at least one olefin selected from the group consisting of ethylene and straight α-olefins in the copolymer obtained in the present invention, is preferably 2 to 97 mol %, more preferably 4 to 89 mol %, further preferably 6 to 84 mol %, particularly preferably 9 to 74 mol %, most preferably 14 to 49 mol % based on 100 mol % of the total monomer units of the copolymer from the viewpoint of heightening of transparency and mechanical strength.

The content of monomer units derived from the vinyl compound (I) in the copolymer, is preferably 2 to 97 mol %, more preferably 10 to 95 mol %, further preferably 15 to 93 mol %, particularly preferably 25 to 90 mol %, most preferably 50 to 85 mol % based on 100 mol % of the total monomer units of the copolymer from the viewpoint of heightening of transparency and mechanical strength.

Though the amount to be contained of monomer units derived from the polyene (II) in the copolymer, can be not necessarily determined in general because the content varies depending on the kind thereof, it is preferably 0.0001 mol % or more, more preferably 0.001 mol % or more, further preferably 0.01 mol % or more, particularly preferably 0.02 mol % or more % based on 100 mol % of the total monomer units of the copolymer from the viewpoint of heightening of mechanical strength. Further, it ispreferably 10 mol % or less, more preferably 5 mol % or less, further preferably 1 mol % or less and particularly preferably 0.1 mol % or less based on 100 mol % of the total monomer units of the copolymer from the viewpoint of improvement of processability.

The contents of repeating units derived from the vinyl compound (I) and repeating units derived from the polyene (II) can be determined a common method using $^1$H-NMR spectrum or $^{13}$C-NMR spectrum.

The glass transition point (Tg) of the copolymer can be properly controlled by mainly the catalyst used or the composition of the copolymer obtained, and it is preferably 0° C. or higher, more preferably 10° C. or higher, further preferably 20° C. or higher, and most preferably 30° C. or higher from the viewpoint of heightening of rigidity and transparency. Besides, the effect of the invention can be obtained more significantly in the production of the copolymer of high glass transition point (Tg). On the other hand, the glass transition point (Tg) of the copolymer is 200° C. or lower, more preferably 150° C. or lower, further preferably 120° C. or lower and most preferably 90° C. or lower from the viewpoint of processability.

The molecular weight distribution (Mw/Mn) which is indicated as ratio of weight average molecular weight (Mw) to number average molecular weight (Mn), of the copolymer can be controlled by mainly kind of the catalyst used and the amount of the polyene (II) used, and it is preferably 1.5 to 7.0, more preferably 1.5 to 5.0, further preferably 1.5 to 3.0 from the viewpoint of mechanical strength and transparency.

Further, the weight average molecular weight (Mw) of the copolymer can be also controlled by mainly the amount of the polyene (II) used, and is preferably 10,000 or higher, more preferably 30,000 or higher, further preferably 50,000 or higher from the view point of mechanical strength. Further, it is preferably 1,000,00 or lower, more preferably 500,000 or lower and further preferably 400,000 or lower from the viewpoint of processability.

Moreover, the intrinsic viscosity [η] of the copolymer can be also properly controlled mainly by the amount of the polyene (II) used as the same as the weight average molecular weight (Mw), and is preferably 0.25 dl/g or more, more preferably 0.3 dl/g or more, further preferably 0.35 dl/g or more from the viewpoint of mechanical strength. Further, it is preferably 10.0 dl/g or less, more preferably 6.0 dl/g or less, and further preferably 5.0 dl/g or less from the viewpoint of processability.

The copolymer may be optionally combined with publicly known additives such as antioxidants, weathering agents, lubricants, anti-blocking agents, antistatic agents, anti-clouding agents, anti-dropping agents, coloring agents, fillers and the like.

The molding method of the copolymer is not particularly restricted, and there can be listed an inflation molding which contains extruding a molten resin from a circular die and winding up a film which is inflated cylindrically, a T-die molding which contains extruding a molten resin from a linear die and winding up an extruded film or sheet, a calender molding, a blow molding, a sheet molding, a laminate molding, an injection molding, a foam molding, a profile extrusion molding, and the like.

The copolymer can be suitably used as industrial materials such as automobile parts and electric and electronic parts, optical materials such as lenses, prisms, optical fibers and recording media, packaging materials such as trays for food packaging and films for food packaging, and the like because the copolymer is excellent in mechanical strength and good in rigidity and transparency, further has a good processability, dumping property and adhesiveness, and is low in birefringence.

EXAMPLE

The present invention will be explained by way of Examples and Comparative Examples below.

Measurements of properties in the Examples were carried out by the following methods.

(1) The intrinsic viscosity [η] was measured at 135° C. with an Ubbellohde viscometer using tetralin as a solvent.

(2) The melting peak temperature and glass transition point of the copolymer were measured using a DSC (SSC-5200 manufactured by SEIKO INSTRUMENT CO.) under the following conditions.

Conditioning: maintaining for 10 minutes at 200° C. after heating from 20° C. to 200° C. at a rate of 20° C./min, cooling from 200° C. to −50° C. at a rate of 20° C./min, subsequently maintaining for 10 minutes at −50° C.

Measurement of fusion peak temperature and glass transition point: after the conditioning, immediately heating from −50° C. to 400° C. at rate of 20° C./min.

Example 1

Into a 300 ml-glass reactor replaced with argon were introduced 8 ml of dehydrated toluene, 34 ml of vinylcyclohexane and 0.7g of p-divinylbenzene (manufactured by Nippon Steel Chemical Co., Ltd.) dissolved with 2.5 ml of toluene at room temperature. Next, the glass reactor was heated to 50° C., and ethylene was charged in the glass reactor to 0.1 MPa. Subsequently, 2.9 ml of a toluene solution of methylalumoxane (MMAO produced by Tosoh-Akzo Corp., Al atom converted concentration=6 wt %) was charged and a solution of 1.1 mg of isopropylidenebis(indenyl)zirconium dichloride dissolved in 2.2 ml of dehydrated toluene was charged in the glass reactor to initiate polymerization. After stirred for 30 minutes, the reaction mixture was poured into 600 ml of ethanol and a precipitated white solid was collected through filtration. The solid was washed with ethanol and then dried under reduced pressure, to obtain 7.5 g of an ethylene-vinylcyclohexane-p-divinylbenzene copolymer. The copolymer had an intrinsic viscosity [η] of 0.74 dl/g, and a glass transition point of 93° C.

Example 2

Example 1 was repeated except that 11 ml of dehydrated toluene was changed to 12 ml, the solution of 0.7 g of p-divinylbenzene (manufactured by Nippon Steel Chemical Co., Ltd.) dissolved in 2.5 ml of toluene was changed to 0.18 ml of 1,9-decadiene (manufactured by Tokyo Kasei K. K.), the solution of 1.1 mg of isopropylidenebis(1-indenyl)zirconium dichloride dissolved in 2.2 ml of dehydrated toluene was changed to a solution of 0.4 mg of isopropylidenebis(indenyl)zirconium dichloride dissolved in 0.9 ml of dehydrated toluene, to obtain 3.2 g of an ethylene-vinylcyclohexane-1,9-decadiene copolymer. The copolymer had an intrinsic viscosity [η] of 0.68 dl/g, and a glass transition point of 98° C.

Example 3

Example 2 was repeated except that 0.18 ml of 1, 9-decadiene was changed to 0.27 ml, to obtain 19.5 g of an ethylene-vinylcyclohexane-1,9-decadiene copolymer. The copolymer was insoluble in toluene and o-dichlorobenzene, and had a glass transition point of 87° C.

Comparative Example 1

Example 1 was repeated except that 8 ml of dehydrated toluene was changed to 11 ml of dehydrated toluene, and p-divinylbenzene was not charged, to obtain 12.6 g of an ethylene-vinylcyclohexane copolymer. The copolymer had an intrinsic viscosity [η] of 0.53 dl/g, and a glass transition point of 94° C.

INDUSTRIAL APPLICABILITY

According to the present invention, in a process for producing an olefin-based copolymer containing monomer units derived from a vinyl compound having a bulky substituent, a process providing the olefin-based copolymer of high molecular weight by adding a specified polyene, can be provided.

The invention claimed is:

1. A process for producing an olefin-based copolymer, which comprises copolymerizing at least one olefin selected from the group consisting of ethylene and straight chain α-olefins, a vinyl compound (I) described below and a polyene (II) described below:

Vinyl compound (I): viylcyclohexane; and

Polyene (II): a compound having two or more of ethylene bonds and at least one combination of two ethylene bonds in which those are bonded to each other through at least three carbon atoms, wherein contents of monomer units based on the olefin, monomer units based on the vinyl compound (I) and monomer units based on the polyene (II) in the olefin-based copolymer to be obtained are 2 to 97 mol %, 2 to 97 mol % and 0.0001 to 10 mol % or less based on 100 mol % of the total monomer units of the copolymer, respectively.

2. The process according to claim 1, wherein the contents of monomer units based on the olefin, monomer units based on the vinyl compound (I) and monomer units based on the polyene (II) in the olefin-based copolymer to be obtained are 6 to 84 mol %, 15 to 93 mol % and 0.01 to 1 mol % or less based on 100 mol % of the total monomer units of the copolymer, respectively.

3. The process according to claim 2, wherein the polyene (II) is an aliphatic compound.

* * * * *